United States Patent [19]

Kubo

[11] Patent Number: 4,681,326
[45] Date of Patent: Jul. 21, 1987

[54] GAS LUBRICATED PISTON RING ASSEMBLY

[75] Inventor: Isoroku Kubo, Columbus, Ind.

[73] Assignee: Cummins Engine Company, Inc., Columbus, Ind.

[21] Appl. No.: 742,910

[22] Filed: Jun. 10, 1985

[51] Int. Cl.⁴ .............................. F16J 9/08; F16J 9/12
[52] U.S. Cl. ...................................... 277/27; 277/103; 277/165; 277/215
[58] Field of Search .................... 277/215, 27, 3, 165, 277/216, 103

[56] References Cited

U.S. PATENT DOCUMENTS

| | | | |
|---|---|---|---|
| Re. 31,005 | 8/1982 | Prasse et al. | 277/165 X |
| 1,423,943 | 7/1922 | Jones | 277/215 |
| 1,754,625 | 4/1930 | Henning et al. | |
| 2,402,033 | 6/1946 | Flinn | 277/215 X |
| 2,707,118 | 4/1955 | Swartz et al. | 277/27 |
| 2,895,772 | 7/1959 | Chapman et al. | 277/165 |
| 2,983,098 | 5/1961 | Bush | |
| 3,001,609 | 9/1961 | Macks | |
| 3,969,004 | 7/1976 | Schliemann | |
| 4,098,515 | 7/1978 | Sakata | 277/165 |
| 4,106,779 | 8/1978 | Zabcik | 277/27 |
| 4,123,068 | 10/1978 | Van Jorder | 277/165 X |
| 4,324,407 | 4/1982 | Upham et al. | 277/27 |
| 4,462,601 | 7/1984 | Skoog | 277/27 |

FOREIGN PATENT DOCUMENTS

| | | | |
|---|---|---|---|
| 2446252 | 4/1975 | Fed. Rep. of Germany | 277/165 |
| 54-125345 | 9/1979 | Japan | 277/215 |
| 56-39359 | 4/1981 | Japan | 277/27 |
| 789618 | 1/1958 | United Kingdom | 277/165 |

*Primary Examiner*—Robert S. Ward
*Attorney, Agent, or Firm*—Neuman, Williams, Anderson & Olson

[57] ABSTRACT

A piston ring assembly wherein a piston member operating within a cylinder is lubricated by means of gas rather than oil films or solid lubricants. One ring (located near the lower end of piston) or two rings (one located near the lower end and the other near the top end of piston) trap gas between the piston and the cylinder wall to form a gas bearing area. The rings are designed to permit gas flow in one direction into the gas bearing area.

6 Claims, 5 Drawing Figures

GAS LUBRICATED PISTON RING ASSEMBLY

This invention relates to a piston ring assembly for use in internal combustion engines or the like.

BACKGROUND OF THE INVENTION

Internal combustion engines, air compressors and other piston equipment typically have compression rings and oil rings. The compression rings are usually circumferentially disposed around the piston end nearest the compression chamber. They form a gas tight seal between the piston and cylinder wall. The oil ring is located below the compression rings and in piston ring grooves. The purpose of the oil ring is to provide oil control and lubrication for the compression ring or rings by efficiently metering a very thin coat of lubricating oil onto the cylinder wall or cylinder liner wall over the entire stroke of the piston.

Piston thrust loads occur at the piston skirt area below the oil ring where an oil film lubricates the two sliding surfaces,, namely the piston skirt and cylinder liner or cylinder. The piston ring assemblies of conventional reciprocating engines requires oil to lubricate piston-skirt/liner which absorbs the piston thrust load. The sliding area is filled with oil and the oil ring controls the amount of oil which reaches the compression ring area. If the oil ring scrapes excessively, it tends to induce scuffing of the cylinder liner. If, on the other hand, the oil ring delivers too much oil, excessive consumption of oil may occur with the result that carbon forms on the top portion of the piston and increasing the chance of blow-by as well as ring sticking. Also, the amount of hydrocarbons in the engine exhaust gas may be higher due to the evaporation of the oil from the liner surface.

Objects Of The Invention

It is a principal object of this invention to provide a piston ring assembly which is free of the disadvantages inherent with conventional oil-lubricated piston ring assemblies.

It is another object of the invention to provide a piston ring assembly which is adapted for use in advanced internal combustion engines in which oil lubrication and water cooling of the engine are eliminated.

It is another object of the invention to provide a piston ring assembly which provides a gas film between the piston and cylinder liner or cylinder to receive the piston thrust load.

SUMMARY OF THE INVENTION

The invention relates to a piston ring assembly wherein a piston member operating within a cylinder is lubricated by means of gas. In one preferred embodiment of the invention a piston member operating within a cylinder is provided with two axially spaced annular rings which continuously and circumferentially encircle the piston member and form a gas tight seal between the piston and cylinder wall. The two annular rings are axially spaced from each other with one ring being located proximate to the upper or top portion of the piston (compression chamber end of the piston) and the second ring being located proximate to the lower end of the piston (crankcase end of piston). The axial spacing of the two rings is such to provide therebetween a gas bearing for the piston. According to another embodiment of the invention, a single ring is positioned near the lower end of the piston which forms a gas tight seal between the piston and cylinder wall. This ring traps combustion gas so as to form a gas bearing for the piston.

BRIEF DESCRIPTION OF THE DRAWINGS

For the purposes of illustrating the invention, there are shown in the drawings presently preferred embodiments of the invention.

DESCRIPTION OF THE INVENTION

Figure 1:
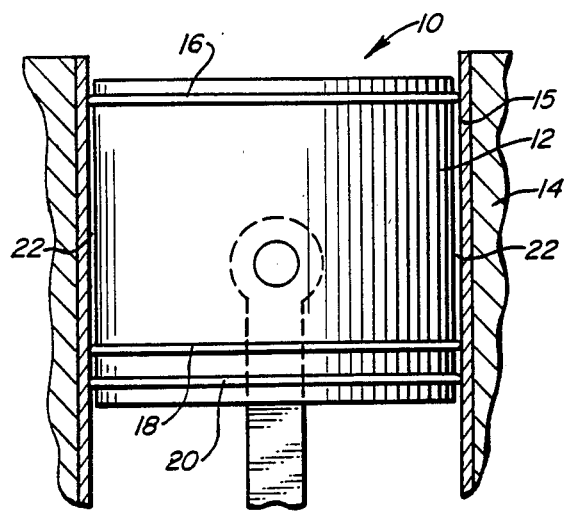
FIG. 1 is a sectional view of a cylinder with a piston carrying piston rings in accordance with one embodiment of this invention.

FIG. 1 illustrates an internal combustion engine piston assembly operating in an engine cylinder generally denoted by the numeral 10. Assembly 10 includes a piston 12 within a cylinder 14 provided with cylinder liner 15. As used herein, cylinder wall is meant to encompass also a cylinder liner. Annular ring 16 extends continuously and circumferentially around the piston and can be accommodated in a suitable groove in piston 12. Ring 16 is positioned near the upper end of the piston 12, i.e., the combustion chamber end of the piston. A second ring 18 is also accommodated in a suitable groove in the piston and extends continuously and circumferentially around the piston. This ring 18 is located proximate the lower end of the piston, i.e., near the crankcase end of the piston. Both of the rings 16 and 18 are circumferentially sized so as to form a tight seal with the cylinder wall. To this end, a variety of expanders or expansion rings or expander springs as are well known in the art can be employed on the inner surface of the rings 16 and 18 so as to force the rings into sealing engagement with the cylinder wall.

The ring 18 is axially spaced from ring 16 so as to form an axially extending space 22 between the rings 16 and 18. In operation, combustion gases are trapped in space 22 to form a gas bearing B (22) for the piston 12 with the result that the piston is separated from the cylinder wall by a film of air, thus dispersing with lubrication by oil. The axial distance between rings 16 and 18 can vary depending on piston size, thrust load and relative location of the piston at the bottom dead center with respect to the bottom end of the cylinder liner. Preferably, the axial distance between the rings 16 and 18 is such as to provide a large gas bearing B for the piston. For example, in an internal combustion engine having a 5.5 inch bore, piston length of 6 inches and the peak thrust load of 2,500 pounds, the axial distance between rings 16 and 18 can suitably be at around 4.0 inches.

In an optional embodiment of the invention, a third annular oil ring 20 is provided on the piston. Ring 20 can be a conventional type oil ring which serves to distribute a thin film of lubricating oil to the cylinder wall and to scrape oil therefrom to prevent formation of a thick film of oil on the cylinder wall throughout the gas bearing B. Various types of piston oil rings are known to the art and ring 20 can be of any suitable type or design and can be used in an oil groove of an internal combustion engine piston. This oil ring 20 can be employed in engines in which oil lubrication is employed. In engines not employing oil lubrication only the two gas rings 16 and 18 which form the gas bearing B need be employed.

Figure 2:
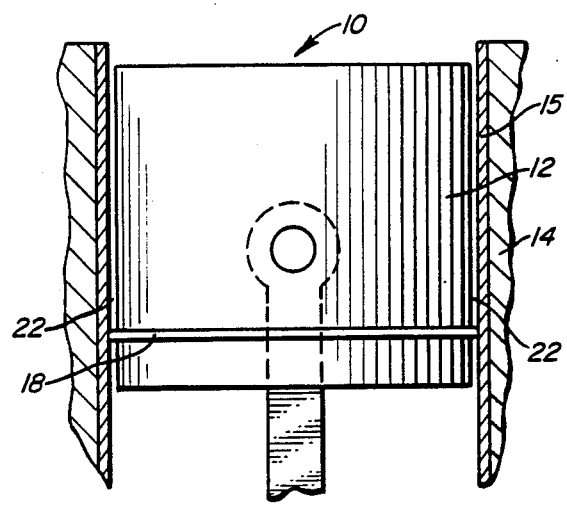
FIG. 2 is a sectional view of a cylinder with a piston carrying one piston ring in accordance with another embodiment of the invention.

In another embodiment of the invention, as illustrated in FIG. 2, only a single ring 18 is employed to form the gas bearing B. This embodiment of the invention is more applicable to high compression engines.

Figure 3:
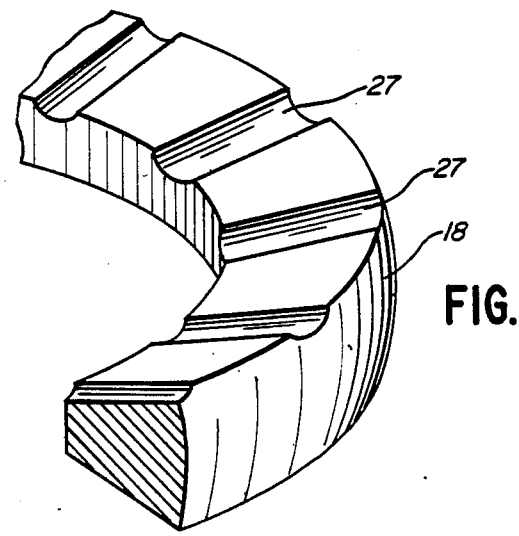
FIG. 3 is an enlarged fragmentary perspective view of one preferred form of piston ring useful in accordance with the invention.
Figure 4:
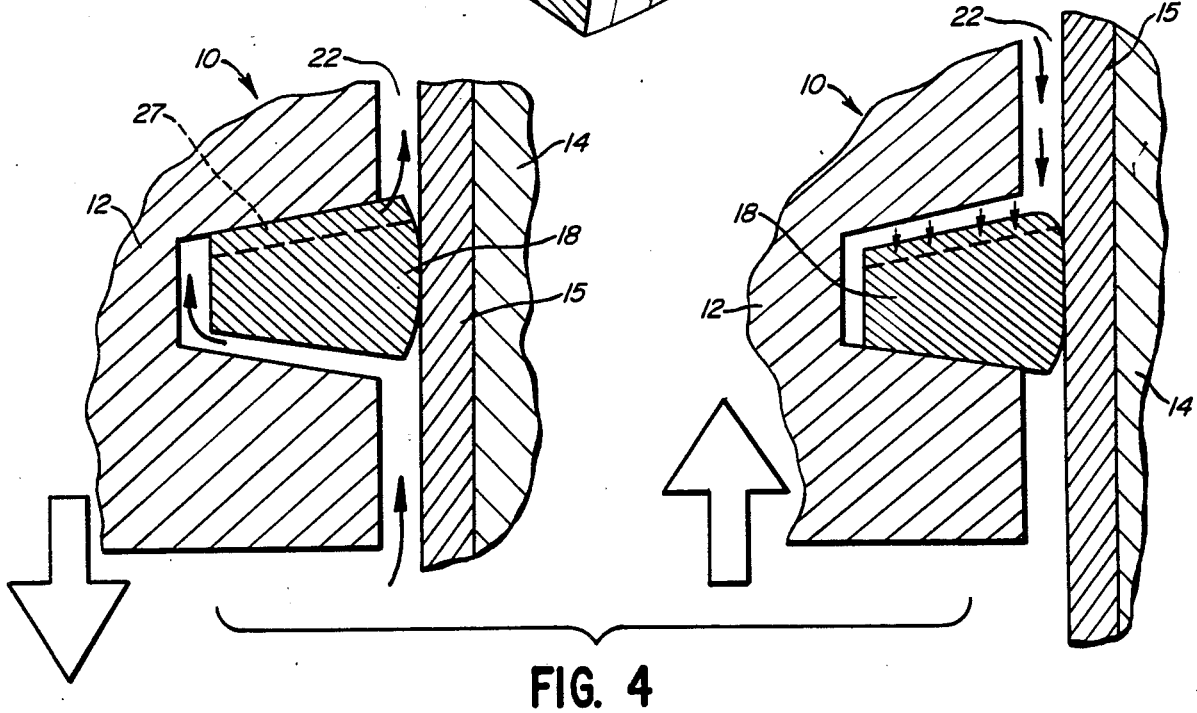
FIG. 4 is a schematic illustration showing the flow of combustion gas as the piston reciprocates with a piston ring as illustrated in FIG. 3.

FIG. 3 shows in perspective a preferred design for the lower gas ring 18. With this one-way seal design the ring seals when combustion gas flows in one direction while permitting gas to flow in the other direction. In this embodiment, the lower gas illustrated in FIG. 3 is provided with a series of radially extending grooves 27 on its upper surface. The gas flow with piston ring design is illustrated in FIG. 4. Thus, on the intake stroke of the piston, i.e., as the piston moves vertically downward, gas flows as shown by the arrows and fills the gas bearing area 22(B). On the upward movement of the piston, combustion gas flows as shown by the arrows and is trapped in space 22 to form the gas bearing B. In similar manner, the upper gas ring 16 can be of the one-way seal design and constructed to have the radially extending grooves 27 on its lower surface. In this case the gas flow with respect to ring 16 would be the reverse of that shown in FIG. 4. The upper gas ring 16 or lower gas ring 18 or both can be provided with grooves 27.

It is preferred that the piston gas rings 16 and 18 be formed of a self-lubricating material such as graphite, graphite composites, "Teflon", "Teflon" composites, polyimide composites reinforced with graphite fiber, "Torlon" and the like. Preferred materials are graphite composites or polyimide composites. Alternatively, the piston gas rings 16 and 18 can be coated with a lubricant such as "Teflon", molybdenum sulfide, "Tribaloy", graphite, partially fluorinated polyimides, chromium oxide, calcium fluoride and the like.

Significant advantages of the gas bearing piston ring assembly of this invention include reduction in oil consumption and reduction of wear because of the very low friction between the piston and cylinder wall. Also, use of a gas bearing or a gas film to support the piston solves the high temperature tribology problems encountered in adiabatic engines. When water cooling is eliminated, the liner temperature at the top ring reversal area increases beyond the capability of the conventional mineral oil to lubricate it. As the in-cylinder engine heat rejection is decreased further, the liner temperature becomes so high that even the most advanced high temperature synthetic oils may not be adequate. Use of a gas bearing to support the piston makes it possible to dispense with oil lubrication.

Elimination of oil contamination of the compressed gas is also an important advantage of the gas-lubricated piston, especially for an air compressor application. Friction loss due to the piston sliding on the liner is also lower with the gas lubrication than with the oil lubrication. Another advantageous application of this invention is use in advanced engines such as an "adiabatic engine", in which cylinder liner temperatures are so high that no liquid oil can be used to lubricate between the piston and liner.

Those modifications and equivalents which fall within the spirit of the invention are to be considered a part thereof.

What is claimed is:

1. A piston ring assembly comprising:
    a piston member,
    an annular groove in said piston member positioned proximate to the lower end of said piston member,
    a circumferentially extending ring positioned in said annular groove adapted for sealing engagement with said cylinder wall,
    said ring being dimensioned to provide a clearance between said annular groove and the bottom and the radially inward surfaces of said ring and having gas flow means on the upper surface thereof whereby upon downward movement of the said piston member gas is permitted to flow up and around said ring so as to be trapped in the axial space between said piston and said cylinder wall above said ring to thereby form a gas bearing for the piston.

2. A piston ring assembly in accordance with claim 1, wherein the gas flow means on the upper surface of said ring comprises a plurality of radially extending grooves.

3. A piston ring assembly comprising:
    a piston member,
    an upper annular groove in said piston member positioned proximate to the upper end of said piston member,
    an upper circumferentially extending ring positioned in said upper annular groove adapted for sealing engagement with said cylinder wall,
    a lower annular groove in said piston member positioned proximate to the lower end of said piston member,
    a lower circumferentially extending ring positioned in said annular groove adapted for sealing engagement with said cylinder wall,
    said lower ring being dimensioned to provide a clearance between said annular groove and the bottom and the radially inward surfaces of said ring and having gas flow means on the upper surface thereof whereby upon downward movement of the said piston member gas is permitted to flow up and around said ring so as to be trapped in the axial space between said piston and said cylinder wall above said ring to thereby form a gas bearing for the piston.

4. A piston ring assembly in accordance with claim 3 wherein the gas flow means on the upper surface of said lower ring comprises a plurality of radially extending grooves.

5. A piston ring assembly comprising:
    a piston member,
    an upper annular groove in said piston member positioned proximate to the upper end of said piston member,
    an upper circumferentially extending ring positioned in said upper annular groove adapted for sealing engagement with said cylinder wall,
    said upper ring being dimensioned to provide a clearance between said annular groove and the top and the radially inward surfaces of said ring and having gas flow means on the lower surface thereof whereby upon upward movement of the said piston member gas is permitted to flow down and around said ring so as to be trapped in the axial space between said piston and said cylinder wall below said ring to thereby form a gas bearing for the piston, a lower annular groove in said piston member positioned proximate to the lower end of said piston member, a lower circumferentially extending ring positioned in said annular groove adapted for sealing engagement with said cylinder wall, said lower ring being dimensioned to provide a clearance between said annular groove and the bottom and the radially inward surfaces of said ring and having gas flow means on the upper surface thereof whereby upon downward movement of the said piston member gas is permitted to flow up and around said ring so as to be trapped in the axial space between said piston and said cylinder wall above said ring to thereby form a gas bearing for the piston.

6. A piston ring assembly in accordance with claim 5 wherein the gas flow means on the upper surface of said lower ring comprises a plurality of radially extending grooves.

* * * * *